(12) United States Patent
Lohr

(10) Patent No.: US 7,505,665 B2
(45) Date of Patent: Mar. 17, 2009

(54) CABLE HOLDER

(75) Inventor: Hauke Lohr, Buxtehude (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/067,814

(22) Filed: Feb. 28, 2005

(65) Prior Publication Data

US 2005/0196121 A1 Sep. 8, 2005

Related U.S. Application Data

(60) Provisional application No. 60/598,273, filed on Aug. 3, 2003.

(30) Foreign Application Priority Data

Mar. 1, 2004 (DE) .................. 10 2004 009 967

(51) Int. Cl.
G02B 6/00 (2006.01)

(52) U.S. Cl. .................. 385/136; 385/134

(58) Field of Classification Search ......... 385/134–139, 385/16; 248/68.1, 316.1; 174/138 G
See application file for complete search history.

(56) References Cited

U.S. PATENT DOCUMENTS

| | | | |
|---|---|---|---|
| 3,648,560 A * | 3/1972 | Roser ................. | 411/421 |
| 4,244,544 A | 1/1981 | Kornat | |
| 4,318,375 A * | 3/1982 | Sauer ................. | 123/195 R |
| 4,618,114 A * | 10/1986 | McFarland .......... | 248/65 |
| 5,014,939 A | 5/1991 | Kraus et al. | |
| 5,106,040 A | 4/1992 | Cafmeyer et al. | |
| 5,170,984 A | 12/1992 | Ruckwardt | |
| 5,316,245 A | 5/1994 | Ruckwardt | |
| 5,578,034 A * | 11/1996 | Estes ................. | 606/61 |
| 5,601,262 A | 2/1997 | Wright | |
| 6,154,583 A * | 11/2000 | Kuroyanagi et al. ........ | 385/16 |
| 6,249,913 B1 * | 6/2001 | Galipeau et al. ........... | 725/76 |
| 6,636,680 B2 * | 10/2003 | Wu et al. ................ | 385/137 |
| 6,709,182 B1 * | 3/2004 | De Jong ................. | 403/12 |
| 7,053,300 B2 * | 5/2006 | Denier et al. ............. | 174/58 |
| 2002/0141706 A1 * | 10/2002 | Nakura et al. ............ | 385/53 |
| 2003/0048978 A1 * | 3/2003 | Chen et al. ............... | 385/16 |
| 2003/0186580 A1 * | 10/2003 | Dambach et al. .......... | 439/497 |
| 2004/0144899 A1 | 7/2004 | Rosemann et al. | |

FOREIGN PATENT DOCUMENTS

| | | |
|---|---|---|
| DE | 77 30 437 A1 | 1/1978 |
| DE | 251 445 A1 | 11/1987 |
| DE | 39 33 305 A1 | 4/1991 |
| DE | 42 13 231 A1 | 10/1993 |
| DE | 102 56 144 A1 | 6/2004 |

(Continued)

OTHER PUBLICATIONS

European Search Report dated Jun. 26, 2006.

*Primary Examiner*—Ellen Kim
(74) *Attorney, Agent, or Firm*—Lerner, David, Littenberg, Krumholz & Mentlik, LLP

(57) ABSTRACT

A cable holder with a cable holder module that can be separably connected to a base element. The base element contains a mount for mounting on a structure of the aircraft. The cable holder module can be exchanged, if so required, which allows simple installation of other or additional cable harnesses.

27 Claims, 2 Drawing Sheets

FOREIGN PATENT DOCUMENTS

| | | |
|---|---|---|
| EP | 0 791 997 A1 | 8/1997 |
| EP | 1126571 | 8/2001 |
| FR | 2730871 | 8/1996 |
| GB | 2 005 758 A | 4/1979 |
| JP | 2003-120862 A | 4/2003 |

* cited by examiner

CABLE HOLDER

CROSS-REFERENCE TO RELATED APPLICATIONS

This application claims the benefit of the filing date of U.S. Provisional Patent Application No. 60/598,273 filed Aug. 3, 2004, the disclosure of which is hereby incorporated herein by reference.

BACKGROUND OF THE INVENTION

The present invention relates to an arrangement for holding and guiding wires, wire sections, cable harnesses and cables in aircraft. The present invention relates, in particular, to a cable holder for an aircraft, a base element for a cable holder for an aircraft, a cable holder module for a cable holder for an aircraft, a cable holder kit, as well as an aircraft with a corresponding cable holder.

In the field of aircraft cabin engineering, the electric/electronic cabin systems, e.g., the illumination systems, communications systems, etc., are undergoing fast-paced developments, wherein more and more cabin systems are nowadays integrated into cabin components.

The cabin systems need to be electrically wired on the cable components (side panelling, ceilings, toilets, etc.).

Conventional cable holders are usually screwed to the corresponding structures of the aircraft or the cabin, respectively. Such cable holders also are frequently referred to as cable clamps. Due to the utilization of screws and threads, cable holders of this type usually have a relatively high weight and require a significant installation height. In addition, these cable holders cannot be flexibly utilized because the installation of additional cable harnesses requires additional holders and new bores in the corresponding structures of the aircraft. All these factors result in a high a manufacturing expenditure for the cabin components.

Subsequent changes are also quite costly and require a high expenditure of labor, particularly when additional cable harnesses need to be installed. The installation of such cable holders in aircraft is also quite complicated in light of the fact that many losable parts such as screws and washers are used.

SUMMARY OF THE INVENTION

According to an exemplary embodiment of the present invention, a cable holder for an aircraft comprises a base element and a cable holder module. The base element has a mount for being mounted to a structure of the aircraft. The cable holder module is arranged for receiving at least one cable. The base element and the cable holder module are separably connected to one another.

This may advantageously result in a modularly designed cable holder, for example, for electric wires. The invention makes it possible, for example, to install additional wire sections after the base element is already mounted, screwed or bonded to the corresponding structure of the aircraft, namely by simply replacing the cable holder module with another cable holder module designed for receiving additional wires.

According to another exemplary embodiment of the invention, the mount on the base element comprises at least one pin that is designed for being inserted into a recess in a surface of the aircraft structure. The at least one pin may be provided with a ribbing or a corrugation.

This cable holder does not comprise many parts that could be lost, e.g., screws and washers. This may be advantageous in the assembly of aircraft because lost parts naturally need to be found and removed because such freely movable parts could represent a safety risk.

According to another exemplary embodiment of the present invention, the cable holder module may comprise at least one snap-in tab for being engaged with the base element, namely in such a way that the cable holder module is held on the base element when the at least one snap-in tab is engaged. It would also be conceivable, for example, to provide the snap-in tab with a hook. The snap-in tab may also be realized in the form of a simple pin, for example, in order to merely prevent the cable holder module from being laterally displaced on the base element in cooperation with another snap-in tab designed for holding the cable holder module on the base element.

According to another exemplary embodiment of the present invention, the pin may be provided with a ribbing or corrugation such that the distribution of an adhesive can be optimized or improved. In other words, this embodiment pertains to a cable holder that may be well suited for being bonded, for example, to cabin components with a honeycomb or laminate structure. The ribbing of the pin makes it possible to achieve a very good coverage or distribution of the adhesive used.

According to another exemplary embodiment of the present invention, a base element for a cable holder for an aircraft may comprise a base element as well as a mount for mounting the base element to a structure of the aircraft. The mount may be designed for being inserted into a recess in a surface of the corresponding aircraft structure. The base element to be used with the cable holder module is preferably designed such that it can be separably connected thereto.

This embodiment relates to a base element for a cable holder that can be installed without screws, i.e., without losable parts such as screws and washers. This base element can also receive a variety of differently designed cable holder modules. This allows a modular utilization of the base element. It may also be advantageous that this base element provides flexible expansion options, for example, when installing additional cable harnesses, namely because the cable holder module can be replaced with a larger cable holder module while the base element remains on the structure of the aircraft.

According to another exemplary embodiment of the present invention, a cable holder module for a cable holder for an aircraft comprises a cable holder element. The cable holder element is designed or adapted for receiving at least one cable, wherein the cable holder element can be separably connected to the base element that is provided with means for being mounted on a structure of the aircraft.

It may be advantageous that the cable holder module can be modularly utilized in connection with various base elements that may already be rigidly bonded to structures of the aircraft.

According to another exemplary embodiment of the present invention, a cable holder kit may comprise a base element, at least a first cable holder module and at least a second cable holder module. The first and the second cable holder module are designed for holding different numbers of cable harnesses and/or cable harnesses with different diameters. This kit can be flexibly utilized for various wiring tasks because the respective cable holder module can be connected to base elements of the same type, for example, depending on the number or size of cable harnesses or wire sections to be installed.

Advantageous embodiments of the present invention are described below with reference to the figures.

DETAILED DESCRIPTION

In the following description of FIGS. 1–7, identical or corresponding elements are identified by the same reference symbols.

Figure 1:
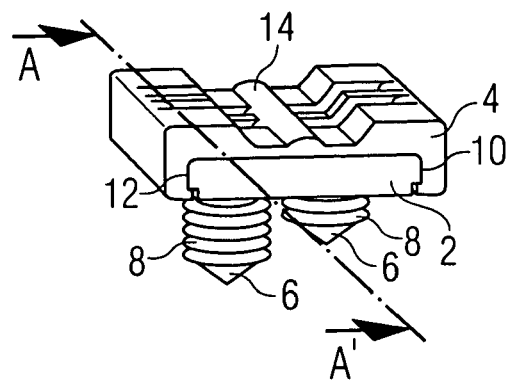
FIG. 1 shows a three-dimensional view of a first embodiment of a cable holder according to the present invention.

FIG. 1 shows a perspective view of a first embodiment of a cable holder for an aircraft according to the present invention. In FIG. 1, the reference symbol 2 identifies a base element with pins 6 for being mounted on a structure of the aircraft. FIG. 1 indicates that the pins 6 are respectively provided with a ribbing 8. The ribbing of the pins 6 is realized such that a simplified distribution of the adhesive can be achieved. The pins 6 may be coated with the adhesive such that the grooves of the ribbing 8 are filled with adhesive, Subsequently, the base element 2 is mounted on a structure of the aircraft by inserting the pins 6 into corresponding recesses in the structure, i.e., recesses with corresponding dimensions. It would be possible, for example, to realize the ribbing in a flexible fashion on its ends such that the adhesive is firmly pressed into the structure of the aircraft when the pin 6 is inserted into a slightly smaller recess.

The cable holder module is identified by the reference symbol 4 in FIG. 1. The cable holder module 4 is separably arranged on the base element 2. The base element 2 is provided with a profile 10 for this purpose. The cable holder module has a corresponding profile 12, wherein this profile 12 contains tabs that engage over contractions of the profile 10. It is advantageous that the tabs of the profile 12 are realized in a flexible fashion, for example, by reducing the material cross section at this location. This makes it possible, for example, to align the cable holder module 4 with an already mounted base element 2 and to rigidly press the cable holder module onto the base body 2 by exerting pressure upon the rear of the cable holder module 4. This causes the tabs of the profile 12 to snap into the constrictions of the profile 10. The cable holder module 4 can subsequently be separated from the base element 2 by forcefully pulling thereon.

The cable holder module 4 may contain a cable receptacle opening 14 that may be adapted to the cable diameter or to the diameter of cable harnesses or to the outside contours of wires to be installed. In the embodiment shown in FIG. 1, the cable receptacle opening 14 is designed for a cable harness or a cable section.

The base element 2 and the cable holder module 4 may be made of plastic, for example, polyamide. The base element 2 and the cable holder module 4 can be easily and inexpensively manufactured, for example, by means of injection-molding.

The utilization of a plastic material for the base element 2 and the cable holder module 4 may make it possible to realize the cable holder with a very low weight. The embodiment of the cable holder shown in FIG. 1 may also have a much lower structural height than conventional holders used so far. The separable connection between the base element 2 and the cable holder module 4 results in a modular cable holder, in which the installation of an additional cable branch over the same section, for example, can be easily realized because it is merely required to replace the cable holder module 4 with another cable holder module 4 that is designed for larger cable sections or a larger number of cable sections. Another advantage is a possible reduction of the manufacturing expenditure for cabin components, to which the cable holder is bonded. Since the connection between the cable holder and the structure of the aircraft is realized in the form of pins 6 that are respectively provided with a ribbing 8 and, for example, can be bonded to the respective aircraft structure, the cable holder according to the present invention does not contain any losable parts such as screws or washers.

The cable holder according to the present invention can be installed, in particular, on cabin components that typically have a honeycomb or laminate structure.

As mentioned above, the cable holder module 4 may be held on the base element 2 by means of the correspondingly designed profiles 10 and 12. In this respect, it would also be possible, however, to utilize conventional snap-fit connections or pins that are inserted into fitted bores or provided with hooks.

The modular design of the holder may make it possible to optimally integrate the holder into the manufacturing process of cabin components. The highest flexibility possible is achieved due to the option of separating the mounted holder from the cabin component and installing the cable harness.

In comparison with conventional screw-type cable holders, the weight of the cable holder according to the invention may in some instances be reduced by up to 45%.

Figure 2:
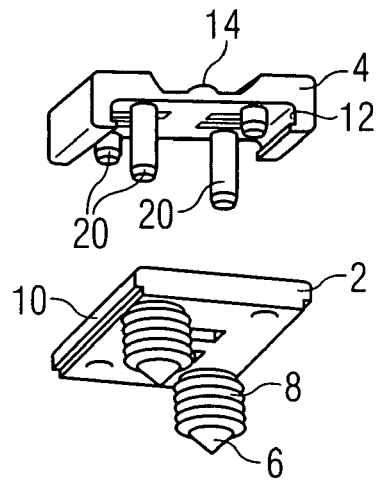
FIG. 2 shows a three-dimensional view of the cable holder according to FIG. 1, wherein the cable holder module is separated from the base element.

FIG. 2 shows the cable holder according to FIG. 1, wherein the base element 2 and the cable holder module 4 are separated from one another. According to FIG. 2, the cable holder module 4 comprises at least one snap-in tab 20 for engaging into a corresponding recess in the base element 2. The snap-in tabs 20 may be provided, for example, with a hook and not only serve for securing the cable holder module 4 from turning or shifting on the base element 2, but also for holding the cable holder module 4 on the base element 2. Due to these measures, the function of the snap-in tabs 20 may supplement the function of the profiles 10 and 12.

However, the pins 20 may also be realized in the form of simple cylindrical pins without hooks and, in essence, merely serve for securing the base element 2 from shifting or turning relative to the cable holder module 4. In this case, the cable holder module 4 is held on the base element 2 by means of the cooperating profiles 10 and 12. However, it may also suffice to provide only the profiles 10, 12, the pins 20 or the snap-in tabs.

The exemplary embodiment of the cable holder for an aircraft shown in FIG. 2 is provided with two pins 6. However, it would also be possible to provide only one pin 6, for example, for very lightweight wire sections, or more than two pins, for example, three, four or five pins 6, for installing heavier wire sections or a larger number of wire sections.

Figure 3:
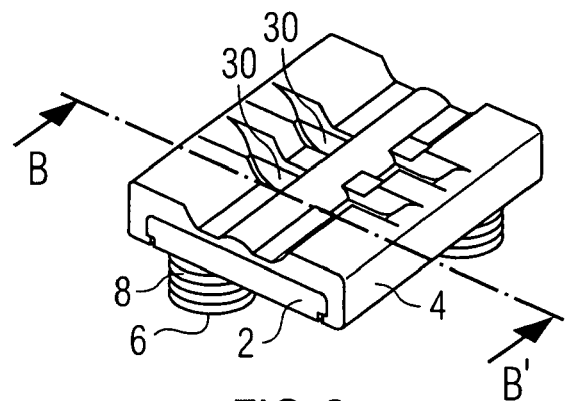
FIG. 3 shows another three-dimensional view of the cable holder according to FIG. 1.

FIG. 3 shows another perspective view of the cable holder according to FIG. 1, namely in the form of a top view of the cable holder module 4. In FIG. 3, the reference symbol 30 identifies slot-like openings for inserting not-shown cable ties that serve for installing the cables, cable harnesses or electric wires on the cable holder module 4.

Figure 4:
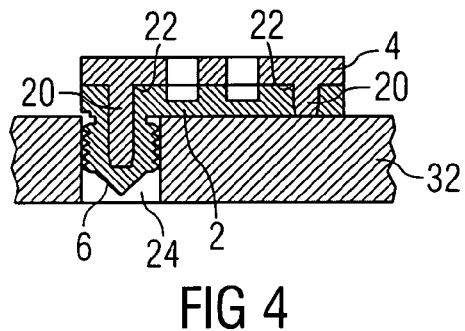
FIG. 4 shows a section through the cable holder according to FIG. 1 along the line A–A'.

FIG. 4 shows a section through the cable holder according to FIG. 1 along the line A–A', wherein the cable holder is mounted on a structure 32 of the aircraft.

According to FIG. 4, the pin 6 is inserted into a recess 24 of corresponding dimensions in the structure 32 of the aircraft. The recess 24 may have slightly smaller dimensions than the outside diameter of the pin 6. The pin 6 may be bonded to the structure 32 of the aircraft.

The structure 32 of the aircraft may consist, for example, of part of a cabin component or a cabin system, wherein the structure 32 may be realized, for example, in the form of a laminate or honeycomb structure.

According to FIG. 4, the cable holder module 4 contains pins 20 that respectively have different lengths. The right pin 20 shown in FIG. 4 has a length that approximately corresponds to the thickness of the base element 2. The left pin 20 of the cable holder module 4 shown in FIG. 4 has a length that is significantly longer than the thickness of the base element 2. The left pin 20 of the cable holder module 4 is arranged on the cable holder module 4 in such a way that it is inserted into a corresponding recess 22 in the base element 2 that is produced in the material of the pin 6. Due to these measures, the contact area between the left pin 20 and the left recess 22 is increased such that higher frictional forces and consequently a greater retaining force may be achieved between the base element 2 and the cable holder module 4 than in instances, in which only a pin 20 and a recess 22 are provided as shown on the right side in FIG. 4.

In other words, the base element 2 contains a recess 22 that is designed for engaging with a pin 20 of the cable holder module, wherein the recess 22 is arranged in the pin 6.

Figure 5:
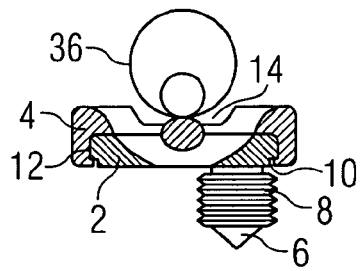
FIG. 5 shows a section through the cable holder according to FIG. 3 along the line B–B'.

FIG. 5 shows a section through the cable holder according to FIG. 3 along the line B–B', wherein a cable 36 or a wire section 36 is arranged in the cable receptacle opening 14. Cables with two different diameters are illustrated in this figure. The section shown in FIG. 5 also elucidates the function of the snap-in tabs or the snap-in tab of the profile 12 of the cable holder module 4 that engage(s) or snap(s) into the contraction of the profile 10 near the underside of the base element 2.

Figure 6:
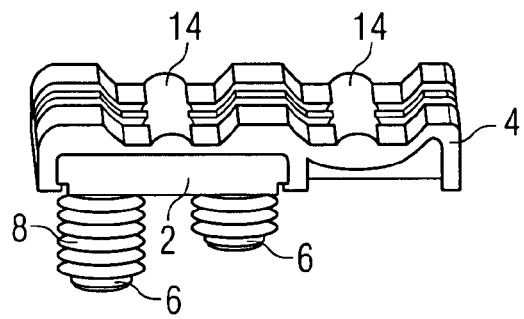
FIG. 6 shows a three-dimensional view of a second embodiment of a cable holder according to the present invention.

FIG. 6 shows a perspective view of a second embodiment of a cable holder for an aircraft according to the present invention. In contrast to the embodiment shown in FIGS. 1–5, this cable holder module 4 contains two cable receptacle openings 14 rather than only one opening 14 for receiving the cables. The base element 2 is designed analogous to the base element 2 shown in FIG. 1.

Figure 7:
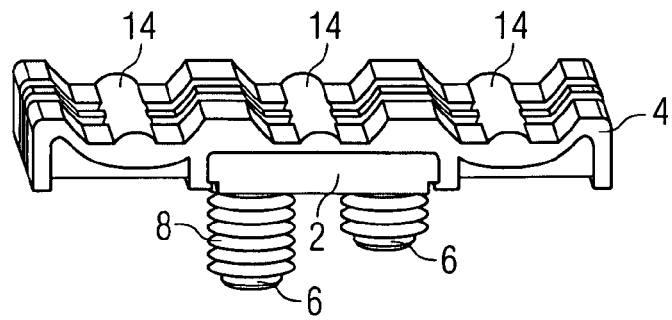
FIG. 7 shows a three-dimensional view of a third embodiment of a cable holder for an aircraft according to the present invention.

FIG. 7 shows a perspective view of a third embodiment of a cable holder according to the present invention. In the embodiment shown in FIG. 7, the base element 2 is designed analogous to that shown in FIGS. 1–6. However, the cable holder module 4 is designed for receiving a larger number of cables. The embodiment shown in FIG. 7 comprises three cable receptacle openings 14 for receiving wire sections or cables.

FIGS. 6 and 7, in particular, elucidate that the same base element 2 can be used in connection with various cable holder modules 4 that are respectively designed for receiving larger/smaller cables or a larger number of cables. This allows a modular utilization of the base element and the cable holder modules, as well as a flexible installation of the cables and simple modifications thereof.

It should be noted that the term "comprising" does not exclude other elements or steps and that "a" or "an" does not exclude a plurality. Also, elements described in association with different embodiments may be combined.

The invention claimed is:

1. A cable holder for an aircraft, comprising:
a base element; and
a cable holder module;
wherein the base element has a mount for mounting to a structure of the aircraft;
wherein the cable holder module is designed for receiving at least one cable;
wherein the base element and the cable holder module are separably connected to one another so as to inhibit any relative movement between one another;
wherein the mount comprises at least one first pin that is designed for insertion into a first recess in a surface of the aircraft structure;
wherein the at least one first pin is provided with a corrugation;
wherein said cable holder module has at least one snap-in tab for an engagement with said base element, in such a way that said cable holder module is held on said base element when said at least one snap-in tab is engaged with said base element;
wherein said cable holder module is provided a longitudinally located groove, and a longitudinally located protrusion in the middle of the groove for holding each cable;
at least a first pin, a second pin are provided on the mount;
wherein the length of said first pin and the thickness of said base element are the same, and the length of said second pin is longer than the thickness of said base element;
said second pin is provided with a corrugation for insertion into a first recess in a surface of the aircraft structure; and
at least two slot-like cable tie openings for each corresponding cable holders on the top surface of said base element.

2. The cable holder of claim 1,
wherein the at least one first pin is provided with a ribbing in order to optimize a distribution of an adhesive.

3. The cable holder of claim 1,
wherein the base element and the cable holder module essentially consist of plastic.

4. The cable holder of claim 1,
wherein the cable holder is designed for installing cable harnesses on cabin components with a honeycomb structure or a laminate structure.

5. The cable holder of claim 1,
wherein the base element has at least one second recess for being engaged with at least one second pin of the cable holder module.

6. A base element module for a cable holder for an aircraft, comprising:
a base element; and
a mount for being mounted on a structure of the aircraft;
wherein the mount has at least one first pin that is designed for being inserted into a first recess in a surface of the aircraft structure; and
wherein the base element is separably connectable to a cable holder module so as to inhibit any relative movement between one another;
wherein said base element is in engagement with a snap-in tab of said cable holder module and is adapted in such a way that said cable holder module is held on said base element when said snap-in tab is in engagement with said base element;

wherein said cable holder module is provided a longitudinally located groove, and a longitudinally located protrusion in the middle of the groove for holding each cable;

at least a first pin, a second pin are provided on said mount;

wherein said at least one pin is provided with a corrugation;

wherein the length of said first pin and the thickness of said base element are the same, and the length of said second pin is longer than the thickness of said base element;

said second pin is provided with a corrugation for insertion into a first recess in a surface of the aircraft structure; and at least two slot-like cable tie openings for each corresponding cable holders on the top surface of said base element.

7. The base element module of claim 6, wherein the at least one first pin is provided with a ribbing such that a distribution of an adhesive is optimized; and wherein the base element essentially consists of plastic.

8. The base element module of claim 6, wherein the base element has a second recess for an engagement with a second pin of the cable holder module.

9. A cable holder module for a cable holder for an aircraft, comprising:

a cable holder element, wherein said cable holder element is adapted for receiving at least one cable;

wherein said cable holder element is separably connectable to a base element that is provided with a mount for being mounted on a structure of the aircraft, said cable holder element and said base element being separably connectable so as to inhibit any relative movement between one another; and wherein said cable holder element has a snap-in tab for an engagement with said base element in such a way that said cable holder element is held on said base element when said snap-in tab is in engagement with said base element, wherein said cable holder element is provided a longitudinally located groove, and a longitudinally located protrusion in the middle of the groove for holding each cable;

at least a first pin, a second pin are provided on said mount;

wherein the length of said first pin and the thickness of said base element are the same, and the length of said second pin is longer than the thickness of said base element;

said second pin is provided with a corrugation for insertion into a first recess in a surface of the aircraft structure; and at least two slot-like cable tie openings for each corresponding cable holders on the top surface of said base element.

10. The cable holder module of claim 9, wherein the cable holder element essentially consists of plastic.

11. A cable holder kit, comprising:

a mount;

at least one base element;

at least one first cable holder module; and at least one second cable holder module; wherein the first and second cable holder modules are adapted for holding different numbers of cable harnesses or cable harnesses with different diameters; and wherein both the first and second cable holder modules have at least one snap-in tab for an engagement with the base element so as to inhibit any relative movement between the first and second cable holder modules and the base element, in such a way that the respective cable holder module is held on the base element when the at least one snap-in tab is engaged with the base element, wherein said at least one of cable holder module is provided a longitudinally located groove, and a longitudinally located protrusion in the middle of the groove for holding each cable;

at least a first pin, a second pin are provided on said mount;

wherein the length of said first pin and the thickness of said base element are the same, and the length of said second pin is longer than the thickness of said base element;

said second pin is provided with a corrugation for insertion into a first recess in a surface of the aircraft structure; and at least two slot-like cable tie openings for each corresponding cable holders on the top surface of said base element.

12. An aircraft comprising:

an aircraft structure for mounting a cable holder; and a cable holder, the cable holder comprising a base element; and a cable holder module;

wherein the base element has a mount that is mounted to the structure of the aircraft;

wherein the cable holder module is designed for receiving at least one cable; and wherein the base element and the cable holder module are separably connected to one another;

wherein the mount comprises at least one first pin that is designed for insertion into a first recess in a surface of the aircraft structure; and wherein the at least one first pin is provided with a corrugation;

wherein said cable holder module has at least one snap-in tab for an engagement with said base element, in such a way that said cable holder module is held on said base element when said at least one snap-in tab is engaged with said base element;

wherein said cable holder module is provided a longitudinally located groove, and a longitudinally located protrusion in the middle of the groove for holding each cable;

at least a first pin, a second pin are provided on the mount; wherein the length of said first pin and the thickness of said base element are the same, and the length of said second pin is longer than the thickness of said base element;

said second pin is provided with a corrugation for insertion into a first recess in a surface of the aircraft structure; and at least two slot like cable tie openings for each corresponding cable holders on the top surface of said base element.

13. A cable holder for an aircraft, comprising:

an aircraft mounting structure of the aircraft; a base element; and a cable holder module;

wherein said base element has a mount for mounting to the mounting structure of the aircraft;

wherein said cable holder module is designed for receiving at least one cable;

wherein said base element and the cable holder module are separably connected to one another; and wherein said cable holder module has at least one snap-in tab for an engagement with said base element, in such a way that said cable holder module is held on said base element when said at least one snap-in tab is engaged with said base element;

wherein said cable holder module is provided a longitudinally located groove, and a longitudinally located protrusion in the middle of the groove for holding each cable;

at least a first pin, a second pin are provided on said mount;
wherein the length of said first pin and the thickness of said base element are the same, and the length of said second pin is longer than the thickness of said base element;

said second pin is provided with a corrugation for insertion into a first recess in a surface of the aircraft structure; and at least two slot-like cable tie openings for each corresponding cable holders on the top surface of said base element.

14. The cable holder of claim 1, wherein the mount comprises at least one first pin that is designed for being inserted into a first recess in a surface of the aircraft structure; and wherein the at least one first pin is provided with a corrugation.

15. The cable holder of claim 13, wherein the at least one first pin is provided with a ribbing in order to optimize a distribution of an adhesive.

16. The cable holder of claim 13, wherein the base element and the cable holder module essentially consist of plastic.

17. The cable holder of claim 13, wherein the cable holder is designed for installing cable harnesses on cabin components with a honeycomb structure or a laminate structure.

18. The cable holder of claim 13, wherein the base element has at least one second recess for being engaged with at least one second pin of the cable holder module.

19. The cable holder of claim 1, wherein said cable holder is an optical fiber cable holder.

20. An aircraft cable holder comprising:

a base element with a pin;

a separate cable holder module connected to said base element such that relative movement between said base element and said cable holder module is inhibited, said separate cable holder module being adapted to hold a cable;

wherein said pin is designed to be of a size and strength such that said cable holder and associated cable may be adequately supported when said pin is inserted into an airplane structure wherein said pin is provided with a corrugation; and wherein said base element is in engagement with a snap-in tab of said separate cable holder module and is adapted in such a way that said separate cable holder module is held on said base element when said snap-in tab is in engagement with said base element;

wherein said cable holder module has at least one snap-in tab for an engagement with said base element, in such a way that said cable holder module is held on said base element when said at least onw snap-in tab is engaged with said base element;

wherein said cable holder module is provided a longitudinally located groove, and a longitudinally located protrusion in the middle of the groove for holding each cable;

at least a first pin, a second pin are provided on the mount;
wherein the length of said first pin and the thickness of said base element are the same, and the length of said second pin is longer than the thickness of said base element;

said second pin is provided with a corrugation for insertion into a first recess in a surface of the aircraft structure; and at least two slot-like cable tie openings for each corresponding cable holders on the top surface of said base element.

21. The cable holder of claim 1, wherein the cable holder module contains a receptacle through which cable may pass completely.

22. The base element of claim 6, wherein the cable holder module contains a receptacle through which cable may pass completely.

23. The cable holder module of claim 9, wherein the cable holder element receives at least one cable in a manner such that the at least one cable passes completely through the cable holder element.

24. The cable holder kit of claim 11, wherein the at least one cable holder module holds cable in a manner so as to permit such cable to pass completely through the cable holder module.

25. The aircraft of claim 12, wherein the at least one cable passes completely through the cable holder module when received therein.

26. The cable holder of claim 13, wherein the cable holder module receives at least one cable in a manner wherein the at least one cable passes completely through the cable holder module.

27. The aircraft cable holder of claim 20, wherein the cable holder module permits cable to pass completely through.

* * * * *

UNITED STATES PATENT AND TRADEMARK OFFICE
CERTIFICATE OF CORRECTION

| | | |
|---|---|---|
| PATENT NO. | : 7,505,665 B2 | Page 1 of 2 |
| APPLICATION NO. | : 11/067814 | |
| DATED | : March 17, 2009 | |
| INVENTOR(S) | : Lohr | |

It is certified that error appears in the above-identified patent and that said Letters Patent is hereby corrected as shown below:

Title Page, Item (60) Related U.S. Application Data— "Aug. 3, 2003" should read --August 3, 2004--.

Col. 1, Line 36, delete "a" before manufacturing.

Col. 2, Line 59, "module" should read --modules--.

Col. 3, Line 34, replace "," with --.--.

Col. 5, Line 28, delete "," after "instance".

Col. 6, Line 12, "separably" should read --separately--.

Col. 6, Line 21, delete "," after "element".

Col. 6, Line 28, replace "," after pin with --and--.

Col. 6, Line 36, "holders" should read --holder--.

Col. 6, Line 60, "separably" should read --separately--.

Col. 7, Line 5, replace "," after pin with --and--.

Col. 7, Line 13, "holders" should read --holder--.

Col. 7, Line 28, "separably" should read --separately--.

Col. 7, Line 31, "separably" should read --separately--.

Col. 7, Line 43, replace "," after pin with --and--.

Col. 7, Line 50, "holders" should read --holder--.

Col. 7, Line 66, delete "," after "element".

Col. 8, Line 3, "module" should read --modules--.

Col. 8, Line 7, replace "," after pin with --and--.

Col. 8, Line 14, "holders" should read --holder--.

UNITED STATES PATENT AND TRADEMARK OFFICE
CERTIFICATE OF CORRECTION

PATENT NO. : 7,505,665 B2
APPLICATION NO. : 11/067814
DATED : March 17, 2009
INVENTOR(S) : Lohr It is certified that error appears in the above-identified patent and that said Letters Patent is hereby corrected as shown below:

Col. 8, Line 25, "separably" should read --separately--.

Col. 8, Line 32, delete "," after "element".

Col. 8, Line 40, replace "," after pin with --and--.

Col. 8, Line 48, "holders" should read --holder--.

Col. 8, Line 58, "separably" should read --separately--.

Col. 8, Line 60, delete "," after "element".

Col. 9, Line 1, replace "," after pin with --and--.

Col. 9, Line 9, "holders" should read --holder--.

Col. 10, Line 5, delete "," after "element".

Col. 10, Line 7, "onw" should read --one--.

Col. 10, Line 13, replace "," after pin with --and--.

Col. 10, Line 21, "holders" should read --holder--.

Signed and Sealed this

Seventeenth Day of November, 2009

David J. Kappos
*Director of the United States Patent and Trademark Office*